United States Patent
Ueda et al.

(10) Patent No.: US 6,864,003 B2
(45) Date of Patent: Mar. 8, 2005

(54) CONTROL DEVICE FOR FUEL CELL

(75) Inventors: Kenichiro Ueda, Utsunomiya (JP); Yoshikazu Murakami, Utsunomiya (JP); Masanori Hayashi, Utsunomiya (JP); Satoshi Aoyagi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 420 days.

(21) Appl. No.: 10/190,418

(22) Filed: Jul. 3, 2002

(65) Prior Publication Data

US 2003/0012989 A1 Jan. 16, 2003

(30) Foreign Application Priority Data

Jul. 10, 2001 (JP) ...................................... P2001-209832
Mar. 25, 2002 (JP) ...................................... P2002-084445

(51) Int. Cl.[7] .............................................. H01M 8/04
(52) U.S. Cl. ........................... 429/25; 429/22; 700/286; 700/292
(58) Field of Search ..................... 429/22, 25; 700/286, 700/292

(56) References Cited

U.S. PATENT DOCUMENTS

2001/0001287 A1 * 5/2001 Ueno et al. ................... 429/22
2004/0185316 A1 * 9/2004 Wells et al. .................. 429/22

* cited by examiner

Primary Examiner—Susy Tsang-Foster
(74) Attorney, Agent, or Firm—Anthony A. Laurentano; Lahive & Cockfield, LLP

(57) ABSTRACT

A control device for a fuel cell including a transient state determination unit which determines whether changes in generated output of the fuel cell are within a predetermined range; a hydrogen purge detection unit which detects the presence/absence of a purge command to a hydrogen purge valve; a failure determination unit which determines, if the transient state determination unit determined that it is not a transient state, failure in the hydrogen purge valve based on an actual hydrogen pressure value at an inlet portion of the fuel cell and a target hydrogen pressure value, which is set in accordance with the presence/absence of the purge command detected by the hydrogen purge detection unit; and an alarm unit which generates an alarm when failure in the hydrogen purge valve is determined by the failure determination unit.

5 Claims, 3 Drawing Sheets

CONTROL DEVICE FOR FUEL CELL

BACKGROUND OF THE INVENTION

1. Field of the Invention

The present invention relates to a control device for a fuel cell used for a fuel cell powered vehicle. More specifically, the present invention relates to a control device for a fuel cell which is capable of detecting failure in a hydrogen purge valve disposed at a hydrogen exhaust line of a fuel cell.

2. Description of Related Art

In a fuel cell stack formed by stacking a plurality of PEM type fuel cell units in series, electromotive force is obtained by supplying fuel (i.e., hydrogen) to its anode and an oxidizing agent (e.g., air) to its cathode.

In the above fuel cell, electric power and water is generated by the reaction of hydrogen and oxygen. If the water generated by the reaction is condensed to water drops and remains in a reaction gas passage of the fuel cell unit, the water blocks the reaction gas passage and causes a reduction in the cell output voltage. This phenomenon is called flooding. In order to prevent or eliminate the problem of flooding, the water generated is discharged to the outside when the fuel cell generates power of a certain amount or for a certain period of time, or the cell voltage decreases below a standard voltage. Also, if the water generated is condensed to water drops and blocks the reaction gas passage, the reaction gas is not supplied beyond the water blocking the line. Accordingly, a partial gas shortage is generated, and damage is caused to a solid polymer electrolyte membrane to lower the performance thereof.

In order to carry out the above-mentioned discharge of the generated water to the outside, a hydrogen purge valve is disposed at an anode gas exhaust line of a pressurized hydrogen circulation type fuel cell system, and the water generated by the reaction is discharged to the outside by opening the hydrogen purge valve.

SUMMARY OF THE INVENTION

As explained above, the hydrogen purge valve plays a very important role in maintaining the functioning of the fuel cell system.

Accordingly, one of the objects of the present invention is to provide a control device for a fuel cell which is capable of detecting failure of the hydrogen purge valve.

Also, another object of the present invention is to provide a control device for a fuel cell which is capable of smoothly carrying out the operation of the fuel cell system when the failure of the hydrogen purge valve occurs in its closed state or opened state.

In order to achieve the above objects, the first aspect of the present invention provides a control device for a fuel cell (for instance, a fuel cell stack 22 in an embodiment described later) including: a transient state determination unit (for instance, processes in steps S04, S08, and S12 in a hydrogen purge valve failure detection unit 90 explained in the embodiment) which determines whether changes in generated output of the fuel cell are within a predetermined range; the transient state determination unit including: a supply line (for instance, a hydrogen supply line 26 in an embodiment described later) through which hydrogen is supplied to an inlet portion of the fuel cell, and a discharge line (for instance, a hydrogen discharge line 60b in an embodiment described later) through which hydrogen is discharged from the fuel cell; a hydrogen circulation line (for instance, a hydrogen circulation line 60a in an embodiment described later) which connects the supply line and the discharge line; and a hydrogen purge valve (for instance, a hydrogen purge valve 66 in an embodiment described later) provided with the discharge line, a hydrogen purge detection unit (for instance, a process in step S16 in the hydrogen purge valve failure detection unit 90 explained in the embodiment) which detects the presence/absence of a purge command to the hydrogen purge valve; a failure determination unit (for instance, processes in steps S20 and S26 in the hydrogen purge valve failure detection unit 90 explained in the embodiment) which determines, if the transient state determination unit determined that it is not a transient state, failure in the hydrogen purge valve based on an actual hydrogen pressure value at the inlet portion and a target hydrogen pressure value, which is set in accordance with the presence/absence of the purge command detected by the hydrogen purge detection unit; and an alarm unit (for instance, the hydrogen purge valve failure detection unit 90 explained in the embodiment) which generates an alarm when failure in the hydrogen purge valve is determined by the failure determination unit.

In accordance with the second aspect of the present invention, the above failure determination unit compares the actual hydrogen pressure value with the target hydrogen pressure value which is set in accordance with the presence of the purge command detected, and determines closed failure of the hydrogen purge valve if the actual hydrogen pressure value is larger than the target hydrogen pressure value continuously for a certain period of time.

In accordance with the third aspect of the present invention, the above failure determination unit compares the actual hydrogen pressure value with the target hydrogen pressure value which is set in accordance with the absence of the purge command detected, and determines opened failure of the hydrogen purge valve if the actual hydrogen pressure value is smaller than the target hydrogen pressure value continuously for a certain period of time.

According to the control device for a fuel cell having the above-mentioned configuration, it becomes possible to reliably detect a closed failure (i.e., the valve cannot be opened) or an opened failure (i.e., the valve cannot be closed) of the hydrogen discharge unit. Also, since the failure determination process for the hydrogen discharge unit is not carried out if the transient state determination unit determines that it is a transient state, it becomes possible to increase the reliability in determining failure of the hydrogen discharge unit.

Moreover, it is possible to provide a timer unit with the failure detection unit so that failure of the hydrogen discharge unit is determined when a state determined to be closed failure or opened failure is continued for a certain period of time. Further, evaluation criteria for the transient state determined by the transient state determination unit may include a change in the required amount for a required power generation unit (e.g., a degree of acceleration of an accelerator).

In addition, by adopting the above-mentioned configuration of the control device, it becomes possible to detect an opening or closed failure of the hydrogen discharge unit regardless of the cause since abnormality in pressure is eventually caused if it is an electrical cause or a mechanical cause. Also, since a failure determination process for the hydrogen discharge unit is not performed if the state is determined to be a transient state by the transient state determination unit, it becomes possible to eliminate a possibility of errors in determining failure of the hydrogen discharge unit.

In accordance with the fourth aspect of the present invention, the above control device for a fuel cell further includes an output restriction unit (for instance, a limiter 92 in an embodiment described later) which restricts the upper limit of a generated output required to the fuel cell to be a predetermined value or less if the closed failure is determined.

According to the control device for a fuel cell having the above-mentioned configuration, it becomes possible to continue the operation by maintaining a power generation performance of the fuel cell at a certain level if closed failure is caused. At that time, an amount of water generated can be decreased by continuing the operation at a low output region in which the utilization factor for hydrogen is low in order to reduce the amount of hydrogen supplied.

Also, according to the above control device for a fuel cell, an amount of water produced during the power generation operation can be minimized to the lowest level even if closed failure of the hydrogen discharge unit is caused. Accordingly, the power generation performance of the fuel cell can be maintained within a certain range.

In accordance with the fifth aspect of the present invention, the above control device for a fuel cell further includes an output restriction unit which restricts the upper limit of a generated output required to the fuel cell to be a predetermined value or less if the opened failure is determined; and a circulation line closing unit (for instance, an on-off control valve 64 in an embodiment described later) which closes the hydrogen circulation line if the opened failure is determined.

According to the control device for a fuel cell having the above-mentioned configuration, if opened failure is caused, no hydrogen in the hydrogen supply line is discharged from the hydrogen circulation line. Accordingly, it becomes possible to prevent useless discharge of hydrogen.

That is, if the opened failure is caused, hydrogen supplied from a fuel supply unit is not discharged via an exhaust fuel circulation line before being supplied to the fuel cell, and hence, useless discharge of hydrogen can be prevented.

BRIEF DESCRIPTION OF THE DRAWINGS

Some of the features and advantages of the invention have been described, and others will become apparent from the detailed description which follows and from the accompanying drawings, in which.

DETAILED DESCRIPTION OF THE INVENTION

The invention summarized above and defined by the enumerated claims may be better understood by referring to the following detailed description, which should be read with reference to the accompanying drawings. This detailed description of particular preferred embodiments, set out below to enable one to build and use particular implementations of the invention, is not intended to limit the enumerated claims, but to serve as particular examples thereof.

Figure 1:
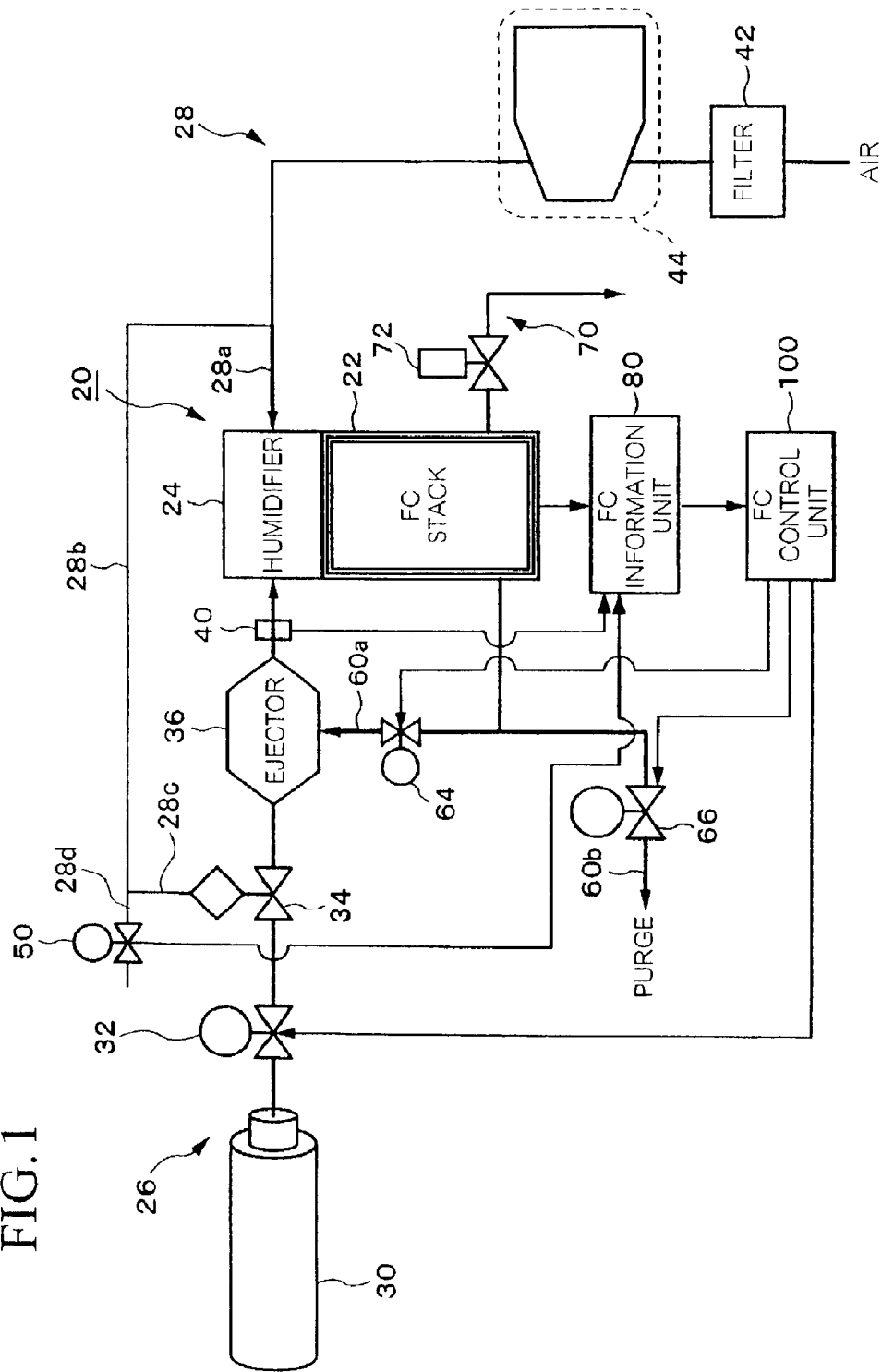
FIG. 1 is a schematic structural diagram showing a control device of a fuel cell system according to an embodiment of the present invention.

FIG. 1 is a schematic structural diagram showing a control device of a fuel cell system 20 according to an embodiment of the present invention. In FIG. 1, a fuel cell stack (fuel cell) 22 has a structure in which a plurality of fuel cell units, each of which includes an anode side diffusion electrode and a cathode side diffusion electrode, and a solid polymer electrolyte membrane sandwiched by the diffusion electrodes, are stacked and integrated. The fuel cell stack 22 includes a humidifier 24 to which a hydrogen supply line 26 and an air (oxygen) supply line 28 are connected so that gases (i.e., hydrogen and air) may be supplied to the above fuel cell stack 22 via the humidifier 24.

Next, the hydrogen supply line 26 will be explained with reference to FIG. 1. The hydrogen supply line 26 is provided with a high pressure hydrogen tank 30, which is a hydrogen supply source, so that high pressure hydrogen may be supplied through the hydrogen supply line 26. Also, an electric cutoff valve 32 is provided with the hydrogen supply line 26 at the high pressure hydrogen tank 30 side so that the supply of hydrogen may be controlled by the opening and closing operation of the electric cutoff valve 32. Moreover, a regulator 34 is disposed at the downstream of the electric cutoff valve 32. The regulator 34 is connected to an air supply line 28c, which will be described later in detail, so that the pressure of hydrogen in the hydrogen supply line 26 may be controlled in accordance with the pressure of air. Further, an ejector 36 is disposed at the downstream of the regulator 34 and is connected to a hydrogen circulation line 60a which will be described later in detail. The ejector 36 draws in the hydrogen in the hydrogen circulation line 60a by means of a negative pressure, and supplies the hydrogen to the hydrogen supply line 26 located at the downstream of the ejector 36. The hydrogen supply line 26 is connected to the humidifier 24 at the downstream of the ejector 36. The hydrogen in the hydrogen supply line 26 is humidified by the humidifier 24 to have a suitable degree of humidity, and is then supplied to the anode side of the fuel cell stack 22. In this embodiment, a pressure sensor 40 is disposed at the downstream of the ejector 36 so that the hydrogen pressure in the hydrogen supply line 26 may be measured by the pressure sensor 40.

Next, an air (oxygen) supply line 28 will be described in detail. A filter 42 is disposed at the upstream of the air supply line 28 so that dust, etc., contained in air may be removed when passing through the filter 42. A supercharging device 44 is disposed at the downstream of the filter 42 so that the pressure of air supplied may be controlled by using the supercharging device 44. The air supply line 28 is divided into air supply lines 28a and 28b at the downstream of the supercharging device 44. The air supply line 28a is connected to the humidifier 24 so that air in the air supply line 28a is supplied to the cathode side of the fuel cell stack 22 after being humidified to a suitable degree of humidity by the humidifier 24. On the other hand, the air supply line 28b is further divided into air supply lines 28c and 28d. The air supply line 28c is connected to the regulator 34. The air supply line 28d is provided with a signal pressure relief valve 50 so that the pressure of air in the air supply line 28d may be measured by the signal pressure relief valve 50. The pressure of hydrogen may be adjusted so that the pressure of hydrogen passed through the regulator 34 falls within a predetermined range of the pressure corresponding to the above-mentioned pressure of air by using the pressure of the supplied to the regulator 34 as a signal pressure. For this reason, it is possible to control the difference in pressure between the anode and the cathode in the fuel cell stack 22 so that it falls within an appropriate range.

When hydrogen is supplied to a reaction surface of the anode side diffusion electrode of the fuel cell stack 22, hydrogen is ionized and moves towards the cathode side diffusion electrode via the solid polymer electrolyte membrane. Electrons generated during this reaction are taken out to an external circuit and are used as direct current electric energy. Since oxygen is supplied to the cathode, hydrogen ions and oxygen are reacted to produce water. After the reaction, hydrogen and oxygen are discharged to the outside of the fuel cell stack 22 via a hydrogen exhaust line 60 and an air exhaust line 70, respectively. This will be explained in detail as follows.

First, the hydrogen exhaust line 60 will be explained. The hydrogen exhaust line 60 is divided into a hydrogen circulation line 60a and a hydrogen exhaust line 60b. The hydrogen circulation line 60a is connected to the ejector 36 so that hydrogen in the hydrogen circulation line 60a may be supplied to the ejector 36. For this reason, unreacted hydrogen discharged to the hydrogen exhaust line 60 may be circulated again through the fuel cell stack 22. An on-off control valve 64, which carries out an opening and closing operation of the hydrogen circulation line 60a based on an electric signal, is disposed at the hydrogen circulation line 60a.

On the other hand, a hydrogen purge valve 66 is disposed at the hydrogen exhaust line 60b so that a hydrogen purging operation and an adjustment operation of the pressure between the anode and the cathode may be carried out by opening and closing the purge valve 66. Note that the hydrogen purge valve 66 is closed and the on-off control valve 64 is opened during the normal power generation mode of the fuel cell system 20 so that hydrogen is circulated through the system without being discharged to the outside.

Next, the air exhaust line 70 will be explained. An air pressure regulation valve 72 is disposed at the air exhaust line 70 so that the pressure may be controlled by opening and closing the air pressure regulation valve 72.

A fuel cell information unit (i.e., an FC information unit) 80 is electrically connected to the fuel cell stack 22, and a current value and a voltage value of each fuel cell unit in the fuel cell stack 22, and a current value and a voltage value of the entire fuel cell stack 22 are input to the FC information unit 80. Also, the FC information unit 80 is electrically connected to the electric cutoff valve 32, and the signal pressure relief valve 50 so that information, such as the pressure of hydrogen, the pressure of air, and the temperature of the fuel cell stack 80, may be input to the FC information unit 80.

Figure 3:
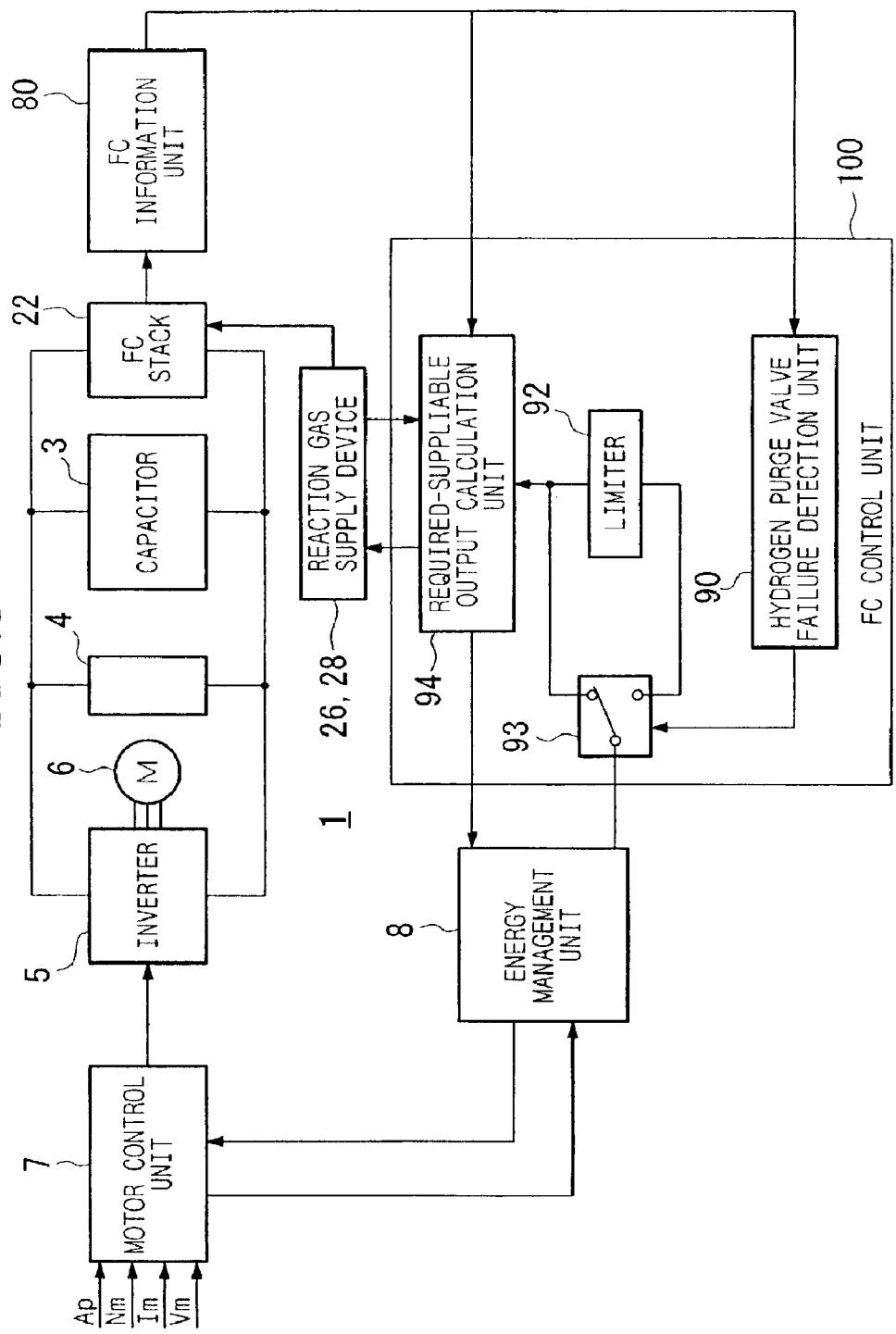
FIG. 3 is a block diagram showing main parts of a fuel cell powered vehicle provided with a control device for a fuel cell according to an embodiment of the present invention.

According to the embodiment of the present invention, a fuel cell control unit (an FC control unit) 100 is provided with the control device. As shown in FIG. 3, a hydrogen purge valve failure detection unit 90, which is connected to the FC information unit 80, is provided with the FC control unit 100, and the failure of the hydrogen purge valve 66 is determined by the hydrogen purge valve failure detection unit 90. The hydrogen purge valve failure detection unit 90 includes a transient state determination means, a failure determination means, and an alarm unit. The transient state determination means determines whether the change in power output of the fuel cell stack 22 is within a standard range. The failure determination means determines the failure in opening and closing of the hydrogen purge valve 66 based on a target pressure value of the anode and a detected value of the anode. The alarm means generates an alarm when the failure in opening or closing the hydrogen purge valve 66 is determined by the failure determination means.

Figure 2:
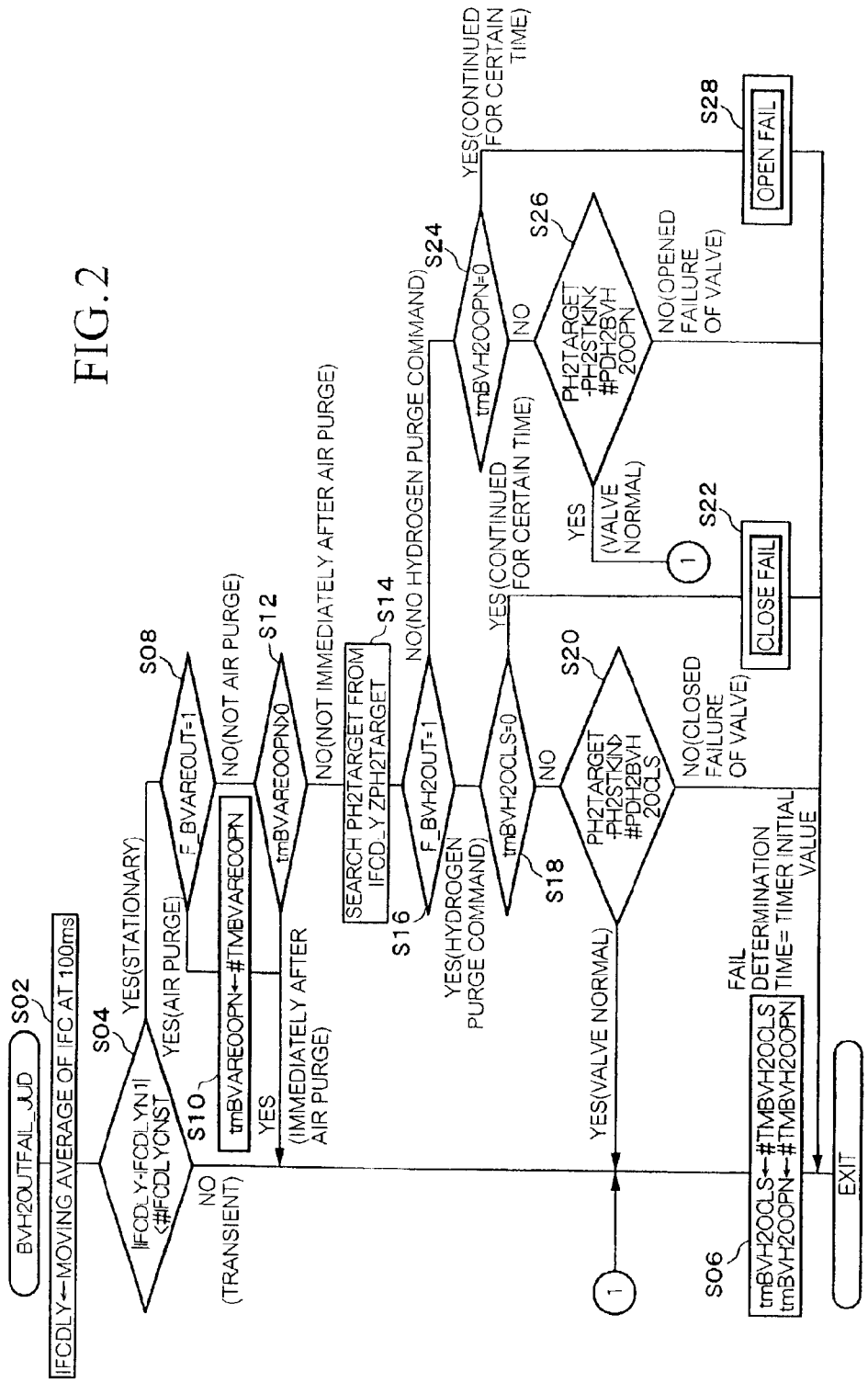
FIG. 2 is a flowchart showing a flow of the process in detecting a hydrogen purge valve failure according to an embodiment of the present invention.

FIG. 2 is a flowchart showing a flow of the process in detecting a hydrogen purge valve failure according to an embodiment of the present invention. First, the moving average (IFCDLY) of a fuel cell power generation current value (i.e., IFC value) detected by the FC information unit 80 is calculated (step S02). In this embodiment, the IFCDLY is the moving average of IFC at 100 msec, and each IFCDLY is calculated every 10 msec. Then, the difference between the moving average IFCDLY of a latest IFC value and an IFCDLYN1, which is the moving average just before, is calculated, and it is determined whether the difference is smaller than a set value of #IFCDLYNST (step S04). If the difference is larger than the set value (i.e., "NO" in S04 shown in FIG. 2), no determination on the detection of failure in the hydrogen purge valve 66 is made since the state is considered as an abrupt transient state, and a failure determination time (tmBVH2OCLS), which is a criterion for determining closed failure, and another failure determination time (tmBVH2OOPN), which is a criterion for determining opened failure, are set (step S06) to temporarily terminate the process of detecting failure of the hydrogen purge valve 66. The cause of the above-mentioned abrupt transient state is considered to be, for instance, a rapid acceleration, and it becomes possible to increase the reliability of the failure determination process by not detecting failure of the hydrogen purge valve 66 on such an occasion. The failure determination time set in this step is used as a timer initial value. Also, since this flow is a subtraction cycle, a certain value is subtracted from the set timer value (for instance, the above-mentioned failure determination time) if the flow is once terminated and restarted. This will be described in detail later.

In step S04, if the above-mentioned difference is smaller than the set value (i.e., "YES" in S04 shown in FIG. 2), it is determined whether an air purging operation is carried out, i.e., the signal pressure relief valve 50 is opened (step S08). In step S08, if it is determined that the air purging operation is carried out (i.e., "YES" in step S08), the above-mentioned process in S06 is carried out after a timer value of air purge (tmBVAREOPN) is set, and the flow of the failure detection process is terminated for a moment. As explained above, since the pressure of hydrogen is controlled by the regulator 34 based on the pressure of air, the pressure of hydrogen decreases as the pressure of air decreases due to the air purging operation. For this reason, according to the embodiment of the present invention, the reliability in the failure detection operation is improved by not detecting the failure of the hydrogen purge valve 66 during the air purging process.

In step S08, if it is determined that the air purging operation is not carried out (i.e., "NO" in step S08 in FIG. 2), it is determined if it is immediately after the termination of the air purging process (step S12). The determination is made based on whether the above-mentioned timer value (tmBVAREOPN) is greater than zero. In step S12, if it is determined that it is immediately after the termination of the air purging process (i.e., "YES" in step S12 in FIG. 2), the failure detection process for the hydrogen purge valve 66 is not carried out, and the flow of the failure detection process is temporarily terminated after carrying out the above-mentioned operation in S06. In step S12, if it is determined that it is not immediately after the air purging process (i.e., "NO" in step S12), the failure determination process for the hydrogen purge valve 66 is performed. In this manner, the reliability in detecting failure of the hydrogen purge valve 66 is further improved. Note that although the case where the air purging process is performed using the signal pressure relief valve 50 is explained in this embodiment, if the signal pressure relief valve 50 is not present or the air purging process is not carried out, the above-mentioned steps of S08-S12 can be omitted.

Next, the failure determination process for the hydrogen purge valve 66 will be explained. First, an expected hydrogen pressure (PH2TARGET) is calculated based on the above-mentioned IFCDLY (step S14). In this embodiment, the characteristic relationship betweeen the IFCDLY and the expected hydrogen pressure is prestored as table data, and the expected hydrogen pressure corresponding to the above-mentioned IFCDLY is calculated based on the data. Then, it is determined whether there is a hydrogen purging command (step S16), and determination in closed failure of the valve is made if there is a hydrogen purging command (i.e., "YES" in step S16), and determination in opened failure of the valve is made if there is no hydrogen purging command (i.e., "NO" in step S16). Note that although the case where the characteristic relationship is stored as table data is explained in this embodiment, it is not limited as such, and the expected hydrogen pressure may be calculated by using, for instance, an arithmetic expression.

Next, explanation will be made for the case where there is a hydrogen purging command. First, it is determined if the value of the failure determination time (tmBVH2OCLS) for closed failure is equal to zero (step S18). Instep S18, if the above failure determination time is not zero (i.e., "NO" in step S18), a determination process for a closed failure of the valve will be carried out. In this embodiment, the difference between the above-mentioned expected hydrogen pressure and the actual hydrogen pressure (PH2STKIN) measured by the pressure sensor 40 is used, and it is determined whether the difference is larger than the set value (#PDH2BVH2OCLS) (step S20). If the hydrogen purge valve 66 is opened due to the hydrogen purging command, the actual hydrogen pressure should be lower than the expected pressure. Accordingly, if the difference in pressure is larger than the set value in step S20 (i.e., "YES" in step S20), it is determined that the hydrogen purge valve 66 is normally operated, and the flow of the failure detection process is temporarily terminated after carrying out the process described in the above-mentioned step S06. If the difference in pressure detected is smaller than the set value in step S20 (i.e., "NO" in step S20), it is determined that closed failure is caused in the hydrogen purge valve 66 since the difference in pressure is too small, and the flow of the failure detection process is terminated. When the flow is terminated, a certain value is subtracted from the above-mentioned failure determination time for a closed failure. Accordingly, when the value of the failure determination time becomes zero after repeating the above-mentioned process, it is determined that a state of closed failure is continued for a certain period of time in step S18, and the determination in the closed failure (Close Fail) of the hydrogen purge valve 66 is confirmed (step S22).

Next, explanation is made for the case where there is no hydrogen purging command. First, it is determined if the value of failure determination time (tmBVH2OOPN) for opened failure is equal to zero (step S24). In step S24, if the above failure determination time is not zero (i.e., "NO" in step S24), a determination process for an opened failure of the valve will be carried out. In this embodiment, the difference between the above-mentioned expected hydrogen pressure and the actual hydrogen pressure (PH2STKIN) measured by the pressure sensor 40 is used, and it is determined whether the difference is smaller than the set value (#PDH2BVH2OOPN) (step S26). The hydrogen purge valve 66 should be in its closed state since there is no hydrogen purging command, and the actual hydrogen pressure should be substantially equal to the expected pressure. Accordingly, if the difference in pressure is smaller than the set value in step S26 (i.e., "YES" in step S26), it is determined that the hydrogen purge valve 66 is normally operated, and the flow of the failure detection process is temporarily terminated after carrying out the process described in the above-mentioned step S06. If the difference in pressure is determined to be larger than the set value in step S26 (i.e., NO in step S26), it is determined that opened failure is caused in the hydrogen purge valve 66 since the difference in pressure is too large, and the flow of the failure detection process is terminated. When the flow is terminated, a certain value is subtracted from the above-mentioned failure determination time for an opened failure. Accordingly, when the value of the failure determination time becomes zero after repeating the above-mentioned process, it is determined that a state of opened failure is continued for a certain period of time in step S18, and the determination of the opened failure (Open Fail) of the hydrogen purge valve 66 is confirmed (step S28).

By adopting the above-mentioned configuration, it becomes possible to detect an opening or closed failure of the hydrogen purge valve 66 regardless of the cause since abnormality in pressure is eventually caused if it is an electrical cause or a mechanical cause.

Hereinafter, explanation is made of the control of the device when an opened failure or a closed failure of the hydrogen purge valve 66 is detected. The above-mentioned FC information unit 80 is connected to the FC control unit 100, and the FC control unit 100 is capable of controlling the fuel cell system 20 based on the information from the FC information unit 80. As shown in FIG. 1, the FC control unit 100 is electrically connected to the electric cutoff valve 32, the hydrogen purge valve 66, and the on-off control valve 64 so that it can carry out the opening-closing control of the valves 32, 66, and 64.

When a closed failure of the hydrogen purge valve 66 is detected, the upper limit of the output of the fuel cell stack 22 is set via the command from the FC control unit 100. This will be described later in detail. Also, the opening angle of the electric cutoff valve 32 is adjusted by the FC control unit 100 so that the amount of hydrogen supplied from the high pressure hydrogen tank 30 is minimized, and the operation is performed within a low output range where the stoichiometry of hydrogen can be maintained high. Here, the term "stoichiometry of hydrogen" means the ratio (QH0/QH1) of an amount of hydrogen (QH0) supplied to the fuel cell stack to an amount of hydrogen (QH1) consumed by the fuel cell stack. When the amount of hydrogen consumed is constant (i.e., the generated current is constant), the stoichiometry is proportional to the amount of hydrogen supplied. If the stoichiometry is lowered, the flow rate of hydrogen gas supplied is lowered, and the generated current is also lowered in accordance with the lowering in the flow rate of hydrogen gas supplied. For this reason, it becomes possible to minimize the amount of generated water remaining in the fuel cell stack by increasing the stoichiometry as mentioned above to suppress the flow rate of hydrogen gas supplied. Further, by increasing the stoichiometry of air, it becomes possible to decrease the reverse osmosis of generated water from the cathode side to the anode side so that an increase in the amount of generated water remaining at the anode side can be prevented.

Next, explanation is made when an opened failure of the hydrogen purge valve 66 is detected. In such a case, as in the case of the above-mentioned closed failure, in addition to the restriction by a limiter 92, the on-off control valve 64 is set to be off by an electric signal from the FC control unit 100 to stop the flow in the hydrogen circulation line 60a. In this manner, it becomes possible to reliably supply hydrogen from the hydrogen supply line 26 to the fuel cell stack 22 by preventing hydrogen from counterflowing into a vacuum portion of the ejector 36 and being discharged to the outside from the hydrogen purge valve 66 via the hydrogen circulation line 60a and supplied. Also, by restricting the upper limit of the output of the fuel cell stack 22, it becomes possible to minimize an amount of hydrogen discharged uselessly.

FIG. 3 is a block diagram showing main parts of a fuel cell powered vehicle 1 provided with a control device for a fuel cell according to an embodiment of the present invention. In the fuel cell powered vehicle 1, the fuel cell stack 22 and the capacitor 3 are disposed in parallel to an auxiliary machinery 4 and an inverter 5, which is connected to a motor 6, and power is supplied from the fuel cell stack 22 or the capacitor 3. Also, reaction gas supply devices (a reaction gas supply lines) 26 and 28 are connected to the fuel cell stack 22 in order to supply reaction gases (hydrogen, and oxygen) to the fuel cell stack 22.

The inverter 5 is connected to a motor control unit 7. The motor control unit 7 calculates a required electric energy from input data to calculate an energy required for driving the motor 6. The above mentioned data include, for instance, a degree of acceleration of an accelerator (Ap), the rotation number of (Nm) of the motor 6, current (Im), and voltage (Vm).

Also, the motor control unit 7 is connected to an energy management unit 8 to transmit information on the above-mentioned required energy. The energy management unit 8 calculates a possible electric discharge from the capacitor 3 as well as a target output of the fuel cell stack 22.

The energy management unit 8 is connected to the fuel cell control unit 100 so that a commanded output value may be transmitted to the fuel cell control unit 100. The commanded output value, when no failure in the hydrogen purge valve 66 (refer to FIG. 1) is detected, is input to a required-suppliable output calculation unit 94. The required-suppliable output calculation unit 94 transmits a signal to the reaction gas supply devices 26 and 28 so that reaction gases are supplied to the fuel cell stack 22 to generate power. The fuel cell stack 22 is connected to the FC information unit 80 to input data necessary for calculating the output value. The FC information unit 80 is connected to the required-suppliable output calculation unit 94 to transmit the above data. The required-suppliable output calculation unit 94 transmits an output threshold value of the fuel cell stack 22 to the energy management unit 8. The energy management unit 8 transmits the above threshold value to the motor control unit 7 to restrict the output value.

The FC control unit 100 includes the hydrogen purge valve failure detection unit 90, the limiter 92, and an input switching unit 93, and the hydrogen purge valve failure detection unit 90 is connected to the FC information unit 80. If the failure of the valve is detected by the hydrogen purge valve failure detection unit 90 based on the information from the FC information unit 80, the commanded output value from the energy management unit 8 is input to the limiter 92 by the operation of the input switching unit 93. In this manner, if the commanded output value exceeds the limit of the fuel cell stack 22, it becomes possible to continue the operation of the fuel cell system 20 with safety since the commanded output value can be restricted by the limiter 92.

Having thus described exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

What is claimed is:

1. A control device for a fuel cell comprising:

a transient state determination unit which determines whether changes in generated output of said fuel cell are within a predetermined range; said transient state determination unit including:

a supply line through which hydrogen is supplied to an inlet portion of said fuel cell, and a discharge line through which hydrogen is discharged from said fuel cell;

a hydrogen circulation line which connects said supply line and said discharge line; and a hydrogen purge valve provided with said discharge line, a hydrogen purge detection unit which detects the presence/absence of a purge command to said hydrogen purge valve;

a failure determination unit which determines, if said transient state determination unit determined that it is not a transient state, failure in said hydrogen purge valve based on an actual hydrogen pressure value at said inlet portion and a target hydrogen pressure value, which is set in accordance with the presence/absence of the purge command detected by said hydrogen purge detection unit; and an alarm unit which generates an alarm when failure in said hydrogen purge valve is determined by said failure determination unit.

2. A control device for a fuel cell according to claim 1, wherein said failure determination unit compares the actual hydrogen pressure value with the target hydrogen pressure value which is set in accordance with the presence of the purge command detected, and determines closed failure of said hydrogen purge valve if the actual hydrogen pressure value is larger than the target hydrogen pressure value continuously for a certain period of time.

3. A control device for a fuel cell according to claim 1, wherein said failure determination unit compares the actual hydrogen pressure value with the target hydrogen pressure value which is set in accordance with the absence of the purge command detected, and determines opened failure of said hydrogen purge valve if the actual hydrogen pressure value is smaller than the target hydrogen pressure value continuously for a certain period of time.

4. A control device for a fuel cell according to claim 2, further comprising:

an output restriction unit which restricts the upper limit of a generated output required to said fuel cell to be a predetermined value or less if the closed failure is determined.

5. A control device for a fuel cell according to claim 3, further comprising:

an output restriction unit which restricts the upper limit of a generated output required to said fuel cell to be a predetermined value or less if the opened failure is determined; and a circulation line closing unit which closes said hydrogen circulation line if the opened failure is determined.

* * * * *